US012768520B1

(12) United States Patent
Albert

(10) Patent No.: US 12,768,520 B1
(45) Date of Patent: Oct. 20, 2026

(54) SELF-FASTENING VISOR FOR DISPLAY CABINET

(71) Applicant: Glenn Douglas Albert, Denver, CO (US)

(72) Inventor: Glenn Douglas Albert, Denver, CO (US)

(73) Assignee: WANCO INC, Arvada, CO (US)

( * ) Notice: Subject to any disclaimer, the term of this patent is extended or adjusted under 35 U.S.C. 154(b) by 442 days.

(21) Appl. No.: 18/516,665

(22) Filed: Nov. 21, 2023

Related U.S. Application Data

(60) Provisional application No. 63/427,737, filed on Nov. 23, 2022.

(51) Int. Cl.

| | |
|---|---|
| ***F21V 17/16*** | (2006.01) |
| ***E01F 9/615*** | (2016.01) |
| ***F21V 17/14*** | (2006.01) |
| ***G08G 1/0955*** | (2006.01) |
| ***G09F 13/04*** | (2006.01) |

(52) U.S. Cl.
CPC ............ *F21V 17/164* (2013.01); *E01F 9/615* (2016.02); *F21V 17/14* (2013.01); *G08G 1/0955* (2013.01); *G09F 13/0472* (2021.05); *G09F 2013/05* (2021.05)

(58) Field of Classification Search
None
See application file for complete search history.

(56) References Cited

U.S. PATENT DOCUMENTS

| | | | | |
|---|---|---|---|---|
| 1,666,041 A * | 4/1928 | Buchanan .............. | G08G 1/095 | 340/907 |
| 3,291,975 A * | 12/1966 | Mccullough ............ | G09F 9/307 | 345/55 |
| 4,087,785 A * | 5/1978 | Dodich ................ | B62D 63/064 | 362/153.1 |
| 4,593,265 A * | 6/1986 | McKenney ............. | E01F 9/662 | 40/550 |
| 4,879,549 A * | 11/1989 | Eby ......................... | G09F 13/28 | 340/425.5 |
| 6,497,501 B1 * | 12/2002 | Harder .................. | F21V 17/164 | 362/359 |
| 7,789,540 B2 * | 9/2010 | Gordin .................... | F21S 8/086 | 362/346 |
| 2016/0102846 A1 * | 4/2016 | Clifford ................. | H05B 47/11 | 362/311.06 |

FOREIGN PATENT DOCUMENTS

| | | | |
|---|---|---|---|
| EP | 2284440 A1 * | 2/2011 | ............... F21K 9/20 |

* cited by examiner

*Primary Examiner* — Alexander K Garlen
(74) *Attorney, Agent, or Firm* — Plager Schack LLP; Mark H. Plager; Kara K. Verryt

(57) ABSTRACT

An embodiment of a self-fastening visor configured for attachment to a cabinet having at least one mating opening defined therein may include a shade; spring retention elements extending rearward from the shade; and a mounting flange extending radially outward from a rear portion of the shade; where the mounting flange is movable into contact with the cabinet, and the shade is rotatable relative to the cabinet to secure the shade to the cabinet.

9 Claims, 4 Drawing Sheets

SELF-FASTENING VISOR FOR DISPLAY CABINET

CROSS-REFERENCE TO RELATED APPLICATIONS

This application claims the benefit of priority to U.S. provisional application No. 63/427,737, filed Nov. 23, 2022, which is incorporated by reference herein in its entirety.

FIELD OF THE INVENTION

The invention generally relates to a visor installable on a display cabinet without the need for tools or loose fasteners, and more specifically relates to a visor installable on a display cabinet of an arrow board.

BACKGROUND

In the automotive traffic control industry, an arrow board is often used to inform drivers of lane closures ahead. An arrow board typically includes a flat black, rectangular display cabinet housing 15 or 25 different light bulbs of size PAR36 and/or PAR46, which are arranged in an array on the face of the display cabinet such that various static and dynamic warning patterns (combinations of illuminated bulbs) can be displayed. An arrow board can be mounted on a towable trailer, on truck-bed mountable skids, or directly to a fixed structure on a host vehicle or trailer. The bulbs are usually amber in color and of relatively low electrical power consumption (as most trailered applications are usually solar-powered), and thus the light is emitted efficiently in a narrow beam to support high visibility at a distance of ¼ mile to over one mile away. Each bulb is affixed to the display cabinet face by a corresponding visor, which serves the dual purposes of holding the bulb in place and providing shading for the emitted light. That shading serves to improve the visibility and contrast of the emitted light against the black cabinet face, and to prevent emitted light from being washed out by the sun. The most common way to attach a visor to the display cabinet is with four screws. In order to attach a visor to the display cabinet, a worker must align holes in the visor with mounting holes in the arrow board, insert screws into those aligned holes one at a time, and tighten them by hand with a screwdriver. Because a bulb may need to be replaced in an arrow board actively in use next to a road or highway, that bulb replacement is dangerous for road workers; every second that the worker is removing a visor, replacing a bulb, and securing the visor back in position is a second that the worker is vulnerable to injury by a passing vehicle. In addition, the process of removing a visor, replacing a bulb, and securing the visor may be challenging and unpleasant in the rain or snow, or in desert heat. Inclement weather increases the possibility that a worker may drop or lose a screw, or more than one screw, in the process of removing a visor, replacing a bulb, and securing the visor back in place. Because a screwdriver is required to remove and replace screws, if a worker forgets a screwdriver, or drops it in the dark while attempting to replace a bulb, the replacement of a bulb comes to a halt until the screwdriver is retrieved or until a new one is brought to the worksite.

SUMMARY OF THE INVENTION

A self-fastening visor eliminates the need for fastening hardware such as screws, as well as the need for any installation tool(s), and requires less precision for installation, simplifying and speeding the process to install and replace a visor and bulb.

In an aspect of the invention, attachment features may be integrated into the self-fastening visor, which is typically made of plastic, and into a display cabinet face, which is typically made of sheet metal. The attachment features may be spring-retention elements that extend from a mounting flange of the self-fastening visor, and a reciprocal complement of mating features which are formed openings in the face of the display cabinet. To install the self-fastening visor, the installer simply places the self-fastening visor over a bulb in its respective position on the face of the display cabinet, linearly inserts the spring retention features into the corresponding openings in the display cabinet, and then simply rotates the self-fastening visor by hand through a small angle about its central axis until the spring-retention elements align with matching detents in the openings and snap into a locked, fully installed position.

In an aspect of the invention, the spring-retention elements may be fabricated integrally with the mounting flange of the visor.

In an aspect of the invention, the openings in the display cabinet may be die-punched or laser-cut into the face of the display cabinet.

In an aspect of the invention, the visor rotates substantially 15 degrees from an insertion position to an installed position.

BRIEF DESCRIPTION OF THE DRAWINGS

The use of the same reference symbols in different figures indicates similar or identical items.

DETAILED DESCRIPTION

Figure 1:
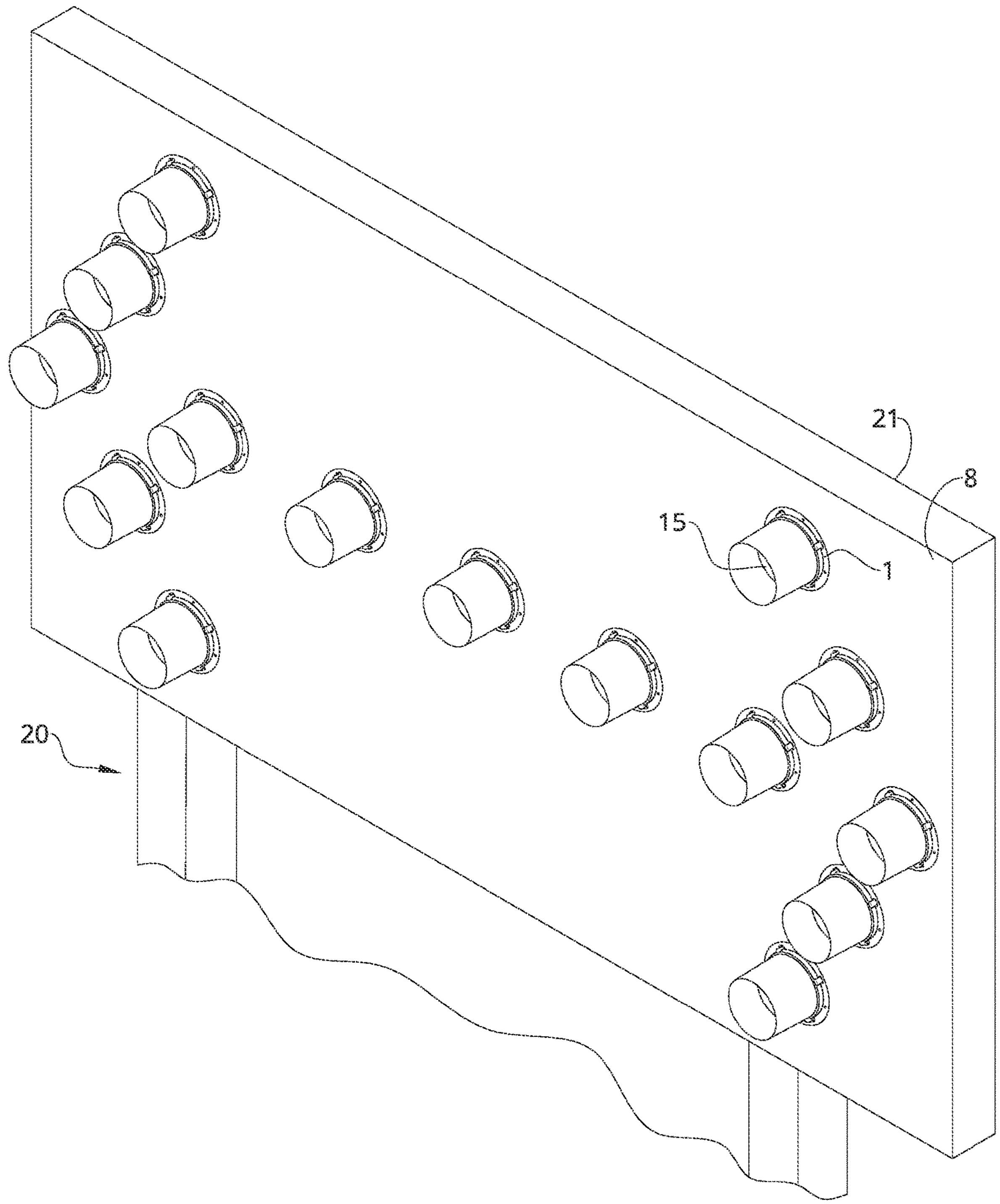
FIG. 1 is a perspective view of an arrow board.

Referring to FIG. 1, an arrow board 20 is shown. The arrow board 20 includes a display cabinet 21 having a cabinet face 8. The cabinet face 8 may be a sheet of material spaced forward from one or more other components of the display cabinet 21. The cabinet face 8 may be fabricated from sheet metal, or from any other suitable material. A plurality of self-fastening visors 1 are attached to the cabinet face 8, and each visor 1 holds a corresponding bulb 15 in place relative to the display cabinet 21. As used in this document, the term "self-fastening" means that a first object attachable to a second object without the use of tools, and without the use of fasteners separate from the first object and the second object.

Figure 2:
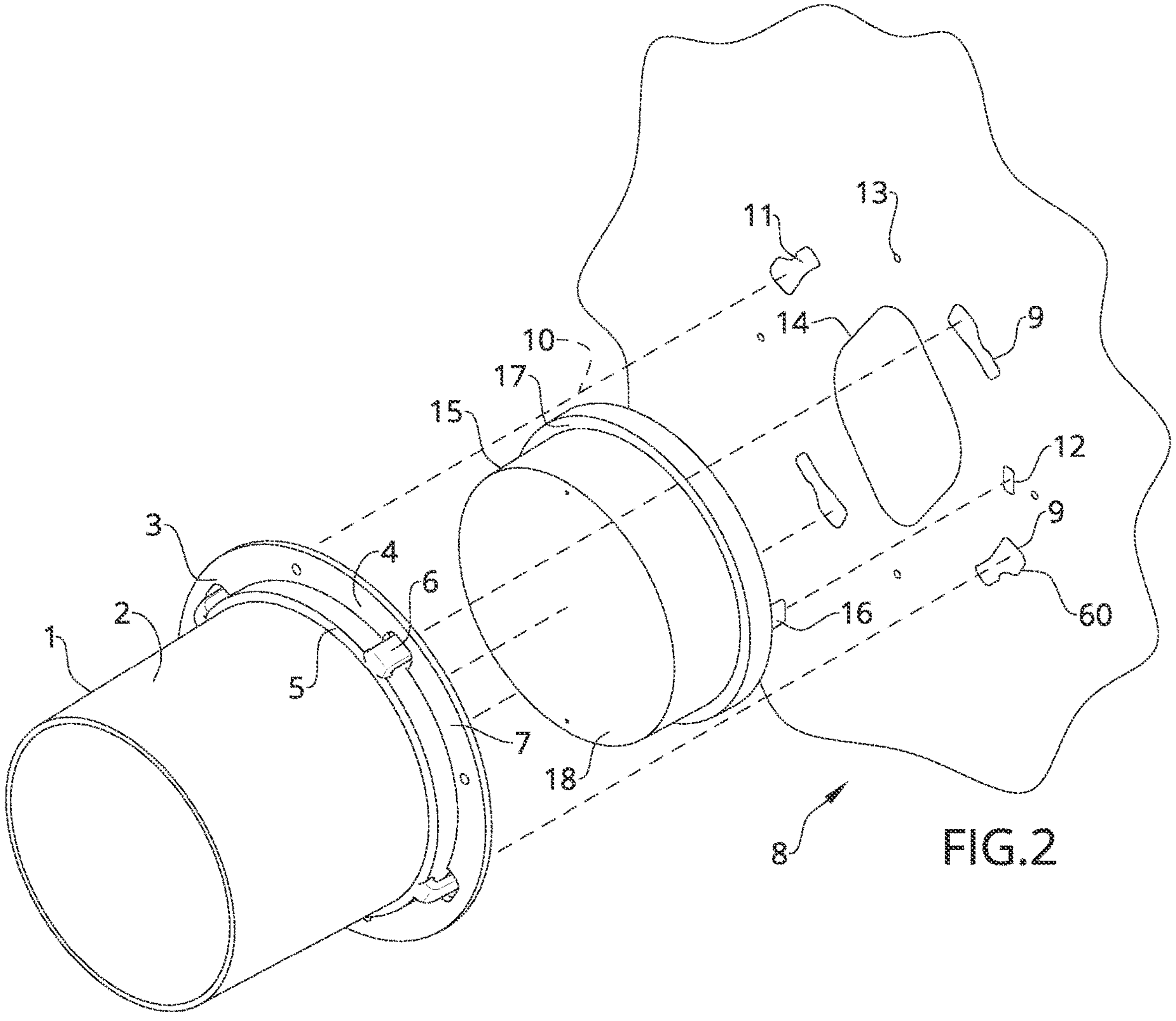
FIG. 2 is an exploded view of a self-fastening visor, a bulb, and a portion of a display cabinet face that is engaged by the self-fastening visor.

Referring also to FIG. 2, an embodiment of a self-fastening visor 1, a bulb 15, and a portion of the cabinet face 8 are shown. As used in this document, the term "self-fastening" means installable by hand, without the need for tools to perform or complete installation. The self-fastening visor 1 includes a shade 2, which is hollow. The shade 2 prevents sunlight from washing out light emitted from the corresponding bulb 15, and allows light from the bulb 15 to exit its front end. The shade 2 may be frustoconical or cylindrical in shape, or may have any other suitable shape. A mounting flange 3 extends radially outward from the shade 2 at the rear of the shade 2. Advantageously, the mounting flange 3 is shaped to engage the cabinet face 8 substantially flush; in some embodiments, the cabinet face 8 is substantially flat, and the rear face of the mounting flange 3 that engages the cabinet face 8 is also substantially flat. Optionally, a plurality of mounting holes 4 are defined through the mounting flange 3; the mounting holes 4 may be circumferentially and evenly spaced apart on the mounting flange. A visor flange 5 may include an outer portion extending radially outward from the visor 1, and may be located adjacent to the mounting flange 3. The inner portion of the visor flange 5 similarly extends radially outward further than the shade 2, and that inner portion is configured to engage the bulb 15. A ring 6 may engage the outer surface of the visor flange 5, and may connect the visor flange 5 to the mounting flange 3. At least one spring retention element 7 extends rearward from the ring 6. Apertures through the mounting flange 3 allow each spring retention element 7 to extend rearward through the ring 6. The spring retention elements 7 are described in greater detail below.

FIG. 2 also shows a bulb 15. The bulb 15 may be a PAR36 or a PAR46 bulb, or may be any other type of bulb suitable for use with an arrow board 20. An advantage of utilizing a PAR36 or PAR46 bulb is that such bulbs are pressed into contact and held against a receiver, without the need for screwing them into place as with an E26 screw mount commonly used in household applications. At least one index tab 16 extends rearward from the bulb 15. The bulb 15 includes a shoulder 17 at or near the rear end of the bulb 15. The shoulder 17 may extend completely circumferentially around the bulb 15, or may extend partially circumferentially around the bulb 15. The shoulder 17 may include a plurality of circumferentially-spaced segments. The shoulder 17 extends radially outward further than the remainder of the bulb 16. The shoulder 17 is sized and shaped to engage the inner portion of the visor flange 5.

Figure 3:
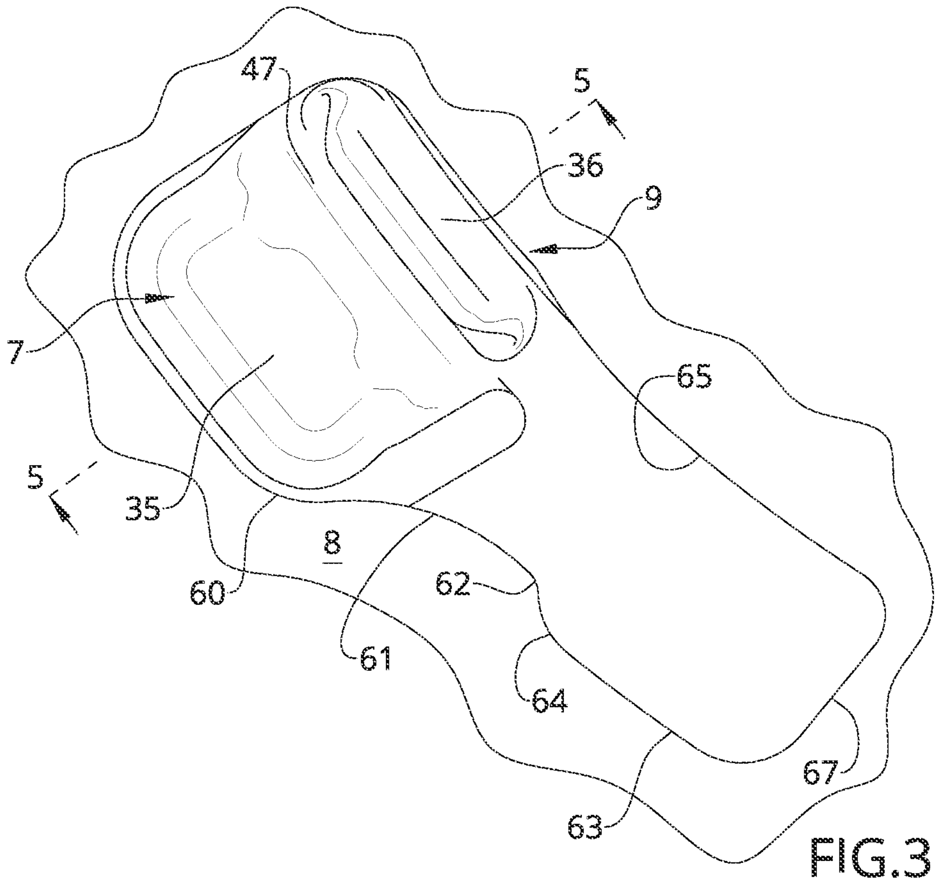
FIG. 3 is a detail view of a mating opening defined in the display cabinet face of FIG. 2, with an end of a spring retention element of the visor in a first, insertion position in the mating opening.

FIG. 2 also shows part of the cabinet face 8. One or more mating openings 9 are defined through the cabinet face 8. Referring to FIG. 3, a detail view of one of the mating openings 9 is shown, with an end of a spring retention element 7 shown in its insertion position into the mating opening 9. The mating opening 9 has an entrance area 60 at one end thereof, and a detent 63 at the opposite end thereof. The detent 63 is narrower than the entrance area 60. Between the entrance area 60 and the detent 63, one side of the spring retention mating element 9 has a cam surface 61 that gradually narrows the mating opening 9 toward the detent 63. Past a narrow point 62, the spring retention element opening 9 widens again along a reverse cam surface 64 to form the detent 63.

Figure 5:
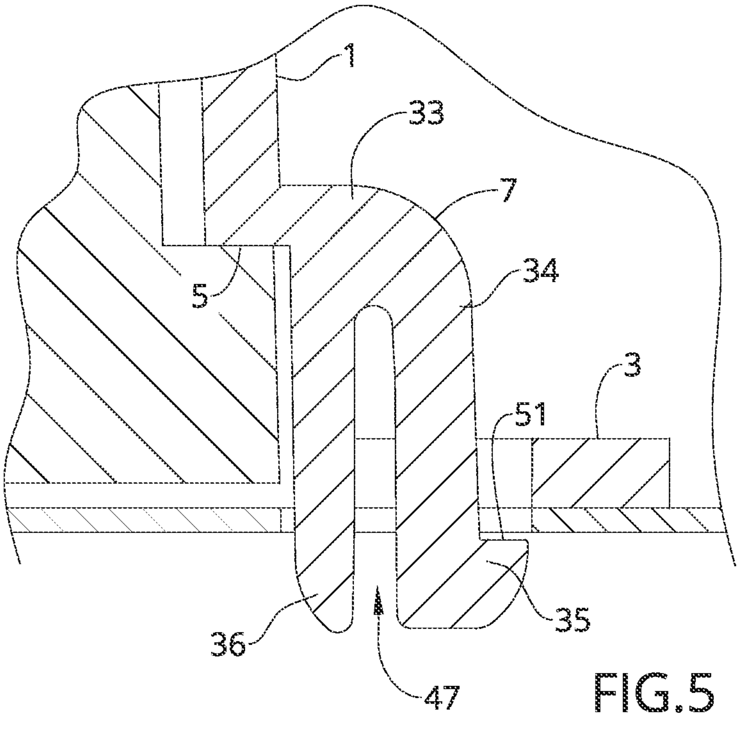
FIG. 5 is a detail cross-section view of a spring retention element of FIG. 3 in the first, insertion position.

Referring also to FIG. 5, a spring retention element 7 extends rearward from the bulb-capturing flange 5 of the visor 1. At junction 33, a spring element 34 separates from a guidepost 36, and the spring element 34 and guidepost 36 are separated by a deflection space 47 from the junction 33 to the rearward, free end of each of the spring element 34 and guidepost 36. The rearward, free end of the spring element 34 includes a retention element 35. The retention element 35 includes a clamping element 51 substantially parallel to an inner surface of the mounting flange 3. The guidepost 36 protects the spring element 34 from overdeflection, as described in greater detail below.

Referring also to FIG. 2, the cabinet face 8 may include one or more mounting holes 13 defined therein or therethrough. The mounting hole or holes 13 are aligned with the mounting hole or holes 4 defined through the mounting flange 3. In this way, legacy screws may be utilized by inserting them through the mounting holes 4, 13, if an installer does not wish to utilize the simpler technology described herein. The cabinet face 8 includes at least one bulb index tab capture slot 12 defined therein or therethrough, each corresponding to an index tab 16 extending rearward from the bulb 15. Each bulb index capture slot 12 receives and retains the corresponding index tab 16 during bulb installation. The cabinet face 8 includes a rear access hole 14 defined therethrough. The rear access hole 14 allows terminals or wiring to protrude rearward from the bulb 15 into an interior of the display cabinet 21, and allows an installer hand access to wires inside the display cabinet during maintenance.

To install the self-fastening visor 1 onto the display cabinet 21, an installer moves the visor 1 through a linear installation step, then a rotary installation step. In the linear installation step, the installer first places the bulb 15 against the cabinet face 8. To do so, the installer inserts each index tab 16 that extends rearward from the bulb 15 into a corresponding bulb index tab capture slot 12 defined in or through the cabinet face 8. The engagement between each index tab 16 and the corresponding bulb index tab capture slot 12 may be a friction fit that provides enough holding force that the installer may remove their hands from the bulb 15 and then use both hands to grasp the visor 1. According to other embodiments, the installer holds the bulb 15 in place with one hand after each index tab 16 engages the corresponding bulb index tab capture slot 12, and grasps the visor 1 with their other hand. Next, the visor 1 is placed over the bulb 15. When the visor 1 is placed over the bulb 15, the visor 1 is able to hold the bulb 15 in place during installation, and the installer may remove their hand from the bulb 15. The visor 1 is then moved along its longitudinal axis toward the cabinet face 8. Alternately, the installer may use a single linear motion to both place the visor 1 over the bulb 15 and move the visor 1 toward the cabinet face 8. As the visor 1 moves toward the cabinet face 8, each spring retention element 7 and guidepost 36 enters and then passes through the entrance area 60 of a corresponding mating opening 9. One or more edges of at least one spring retention element 7 may be chamfered to facilitate the entry of that spring retention element into the corresponding mating opening 9. Linear motion of the visor 1 stops when the mounting flange 3 of the visor 1 contacts the display face 8.

Next, the installer begins the rotary installation step. The installer rotates the visor 1 clockwise about the longitudinal axis of the visor 1. Referring to FIG. 1, arrow 11 indicates the clockwise rotary path about which the visor 1 and thus the spring retention elements 7 are rotated after the spring retention elements 7 have been linearly pressed through the corresponding mating openings 9. That is, first the visor 1 is moved longitudinally about its longitudinal centerline such that the spring retention elements 7 move through the mating openings 9, and then the visor 1 is rotated clockwise about its longitudinal axis.

Figure 4:
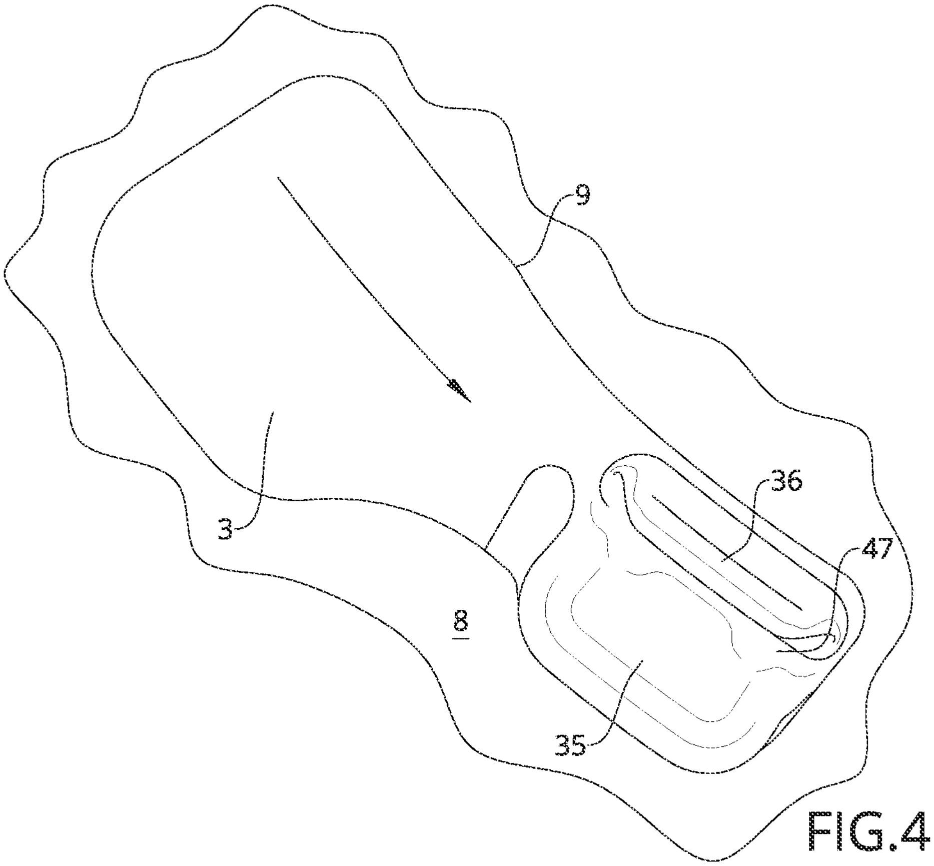
FIG. 4 is a detail view of a mating opening defined in the display cabinet face of FIG. 2, with an end of a spring retention element of the visor in a second, secured position in the mating opening.

Referring also to FIGS. 3-5, as the visor 1 is rotated, the guidepost 36 rides lightly along a ramp surface 65 of the mating opening 9, keeping the visor 1 substantially centered on its longitudinal axis during rotation, and thereby properly positioning and protecting the spring retention element 7 from being over-deflected and damaged. As the visor 1 is rotated, the retention element 35 encounters the cam surface 61 of the mating opening 9. The retention element 35 reaches its maximum point of deflection when it encounters narrow point 62. Particularly at that point of maximum deflection, the guidepost 36 protects the retention element 35 against overdeflection, by preventing the retention element 35 from deflecting further after it contacts the guidepost 36.

The visor 1 continues to be rotated clockwise until a spring retention element 7 and/or a guidepost 36 contacts the forward rotary insertion limit surface 67 of the corresponding mating opening 9. That contact prevents further clockwise motion of the visor 1 relative to the display face 8. The spring retention element 7 and the corresponding mating opening 9 are sized and shaped such that when the spring retention element 7 and/or the guidepost 36 contacts the forward rotary insertion limit surface 67 of the corresponding mating opening 9, that spring retention element 7 also snaps into place against the detent 63, thereby engaging the visor 1 securely with the display face 8. That engagement between the visor 1 presses and holds the bulb 15 into place relative to the display cabinet 21, without affixation of the bulb 15 to the visor 1. According to some embodiments, the installer rotates the visor 1 substantially 15 degrees from the start of the rotation to the end of the rotation when the spring retention element 7 and/or the guidepost 36 contacts the forward rotary insertion limit surface 67. The clamping surface 51 of the retention element 35 clamps the mounting flange 3 and the cabinet face 8 firmly together at the end of the rotation of the visor 1 relative to the cabinet face 8. As a result, the clamping surface 51 of the retention element 35 holds the visor 1 securely to the cabinet face 8, and resists any forces that may be applied to the visor 1 along its longitudinal axis, thereby resisting pullout of the visor 1 from the cabinet face 8.

The reverse cam surface 64 of the mating opening 9 is steeper than the cam surface 61, thereby preventing unwanted reverse rotation of the visor 1 during operational vibration. The slope of the reverse cam surface 64 is steep enough for operational stability, and yet shallow enough for removal of the visor 1 by hand. If the reverse cam surface 64 were infinitely steep, (a radial line) with an infinitely steep mating surface on the spring retention element 7, then reverse rotation of the visor 1 would be impossible without damage to the visor 1, the cabinet face 8, or both.

As used in this document, and as customarily used in the art, terms of approximation, including the words "substantially" and "about," are defined to mean normal variations in the dimensions and other properties of finished goods that result from manufacturing tolerances and other manufacturing imprecisions, and the normal variations in the measurement of such dimensions and other properties of finished goods. While the invention has been described in detail, it will be apparent to one skilled in the art that various changes and modifications can be made and equivalents employed, without departing from the present invention. The invention is not limited to the details of construction, the arrangements of components, and/or the method set forth in the above description or illustrated in the drawings; the figures are merely exemplary and not limiting.

What is claimed is:

1. A self-fastening visor configured for attachment to a workpiece cabinet having at least one mating opening defined therein, comprising:

a shade;

a plurality of spring retention elements extending rearward from said shade; and a mounting flange extending radially outward from a rear portion of said shade;

wherein said mounting flange is movable into contact with the workpiece cabinet, and said shade is rotatable relative to the workpiece cabinet to secure said shade to the workpiece wherein each said at least one mating opening receives one of the plurality of spring retention elements therethrough and comprises an entrance area at one end thereof and a detent at an opposite end thereof, wherein said mating opening comprises a cam surface extending from said entrance area, a narrow point at an end of said cam surface, and a reverse cam surface extending from said narrow point to said detent.

2. The self-fastening visor of claim 1, wherein each said spring retention element is bifurcated toward its rearmost end to form a guidepost spaced apart from a retention element.

3. A system for mounting a workpiece bulb to an arrow board, comprising:

a visor, comprising a shade, a plurality of spring retention elements extending rearward from said shade, and a mounting flange extending radially outward from a rear portion of said shade; and a display cabinet, comprising:

a cabinet face, and a plurality of mating openings defined through said cabinet face;

wherein said visor is longitudinally movable relative to said cabinet face to move said spring retention elements through said mating openings and move said mounting flange into contact with said cabinet face; and wherein said visor is rotatable relative to said cabinet face to secure said visor to said cabinet face and to hold the workpiece bulb between said visor and wherein each said at least one mating opening comprises an entrance area at one end thereof and a detent at an opposite end thereof, wherein said mating opening comprises a cam surface extending from said entrance area, a narrow point at an end of said cam surface, and a reverse cam surface extending from said narrow point to said detent.

4. The system of claim 3, wherein said detent is narrower than said entrance area.

5. The system of claim 3, wherein said reverse cam surface is steeper than said cam surface.

6. The system of claim 3, wherein contact between said spring rotation elements and said mating openings causes said spring rotation elements to bend.

7. A method of installing a self-fastening visor in a display cabinet having a cabinet face, comprising:

providing a visor, comprising a shade, a plurality of spring retention elements extending rearward from said shade, and a mounting flange extending radially outward from a rear portion of said shade; and a display cabinet, comprising a cabinet face, and a plurality of mating openings defined through said cabinet face;

moving said visor along a longitudinal axis thereof until ends of said spring retention elements pass through said mating openings; and rotating said visor about said longitudinal axis, wherein said rotating causes said spring retention arms to deflect inward upon contact with a cam surface of each said mating opening, then deflect outward into a detent upon contact with a reverse cam surface of each said mating opening.

8. The method of claim 7, wherein said rotating comprises rotating said visor substantially 15 degrees clockwise.

9. The method of claim 7, wherein each said mating opening includes a forward rotary insertion limit surface, and wherein said rotating comprises rotating said visor until at least one of said spring retention elements encounters a corresponding said forward rotary insertion limit surface.

* * * * *